US011921925B2

(12) United States Patent
Mizutani

(10) Patent No.: US 11,921,925 B2
(45) Date of Patent: Mar. 5, 2024

(54) IMAGE PICKUP APPARATUS INCLUDING OPERATION MEMBER FOR MOVING POSITION OF DISPLAY OBJECT IN SCREEN

(71) Applicant: CANON KABUSHIKI KAISHA, Tokyo (JP)

(72) Inventor: Shoma Mizutani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/732,642

(22) Filed: Apr. 29, 2022

(65) Prior Publication Data

US 2022/0253143 A1 Aug. 11, 2022

Related U.S. Application Data

(63) Continuation of application No. PCT/JP2020/039676, filed on Oct. 22, 2020.

(30) Foreign Application Priority Data

Nov. 1, 2019 (JP) ................................ 2019-199568

(51) Int. Cl.
*G06F 3/01* (2006.01)
*G03B 13/32* (2021.01)
*G06F 3/041* (2006.01)

(52) U.S. Cl.
CPC ............ *G06F 3/016* (2013.01); *G03B 13/32* (2013.01); *G06F 3/0412* (2013.01)

(58) Field of Classification Search
CPC ........ G06F 3/016; G06F 3/0412; G03B 13/32
See application file for complete search history.

(56) References Cited

U.S. PATENT DOCUMENTS 11,089,204 B1\* 8/2021 Oogami ................. G03B 13/36
2008/0165160 A1\* 7/2008 Kocienda ............ G06F 3/04883
345/175

(Continued)

FOREIGN PATENT DOCUMENTS

JP 2009-217856 A 9/2009
JP 2014-142777 A 8/2014

(Continued)

OTHER PUBLICATIONS

The above US Publication and foreign patent documents 1 and 3 were cited the International Search Report dated 2020-12-15 of PCT/JP2020/039676, a copy of which is enclosed.

(Continued)

*Primary Examiner* — Peter D McLoone
(74) *Attorney, Agent, or Firm* — Cowan, Liebowitz & Latman, P.C.

(57) ABSTRACT

An image pickup apparatus capable of performing an operation of quickly moving a display object in a screen to a separated position and an operation of finely adjusting a position without moving a location where a finger for operation is placed. A camera 1000 displays a ranging point frame movable by a user operation in a screen of a finder visual field display 41 that displays a shot image. The camera 1000 has a complex selector 1 consisting of an OTP 60 that moves a position of the ranging point frame based on a movement amount and a movement direction of sliding movement of a finger of a user, a button base 61 that holds the OTP 60 and detects swing by the user, and an AF-ON button 80 that moves, on a unit basis, the position of the ranging point frame based on a direction of the swing. When autofocus is performed in a shooting scene of a moving subject, the position of the ranging point frame is moved by the OTP 60 or the AF-ON button 80 of the complex selector 1.

9 Claims, 8 Drawing Sheets

(56) References Cited

U.S. PATENT DOCUMENTS

| | | | |
|---|---|---|---|
| 2013/0010170 A1* | 1/2013 | Matsuzawa | H04N 23/62 348/E5.022 |
| 2015/0341542 A1* | 11/2015 | Preston | H04N 23/635 348/346 |
| 2016/0283078 A1 | 9/2016 | Lin et al. | |
| 2017/0366743 A1* | 12/2017 | Park | G06F 3/04883 |
| 2018/0046062 A1* | 2/2018 | Fisher | H04N 23/62 |
| 2021/0243378 A1* | 8/2021 | Oogami | H04N 23/62 |

FOREIGN PATENT DOCUMENTS

| | | |
|---|---|---|
| JP | 6229119 B2 | 11/2017 |
| JP | 2019-0543 A | 4/2019 |
| JP | 2019-054368 A | 4/2019 |

OTHER PUBLICATIONS

The above foreign patent document was cited in the Jun. 27, 2023 Japanese Office Action, a copy of which is enclosed without an English Translation, that issued in Japanese Patent Application No. 2019-199568.

\* cited by examiner

IMAGE PICKUP APPARATUS INCLUDING OPERATION MEMBER FOR MOVING POSITION OF DISPLAY OBJECT IN SCREEN

CROSS-REFERENCE TO RELATED APPLICATIONS

This application is a Continuation of International Patent Application No. PCT/JP2020/039676, filed Oct. 22, 2020, which claims the benefit of Japanese Patent Application No. 2019-199568, filed Nov. 1, 2019, both of which are hereby incorporated by reference herein in their entirety.

BACKGROUND OF THE INVENTION

Field of the Invention

The present invention relates to an image pickup apparatus, and more particularly to an image pickup apparatus including an operation member that moves a position of a display object in a screen.

Background Art

In general, an operation member for starting autofocus is provided in an image pickup apparatus such as a digital camera. There is known an image pickup apparatus that displays a plurality of positions where autofocus can be performed on a screen as a display object such as a cursor and moves a position of the cursor by an operation member such as a joystick or a dial. The operation member such as the joystick or the dial provides a physical click feeling for each operation, which can accurately move the cursor.

In recent years, a range in which autofocus can be performed is widened in the image pickup apparatus, and the number of points (positions) at which autofocus on a screen can be selected tends to increase. As a result, the user can automatically adjust a focus in a more free composition.

On the other hand, by the operation using the conventional operation member such as the joystick or the dial, movement for one point is basically performed by one operation, and thus it is necessary to perform the operation many times in order to move the cursor to a separated position on the screen. Thus, in a shooting scene where a position to be autofocused greatly changes, such as shooting of a moving subject, the immediacy of the movement of the position of the cursor deteriorates.

There is, in order to prevent such deterioration in immediacy, a technology in which a user can select a position where autofocus can be performed on a touch pad provided on a liquid crystal disposed on a rear surface of an image pickup apparatus. As a result, the cursor can be moved and the focus position can be selected according to a movement amount of a finger on the touch pad, which enables the user to quickly cause the cursor to move by multiple points.

However, since the touch pad also detects a slight amount of the movement of the finger, it is difficult to perform an operation of moving the cursor by only one point. Thus, for example, the above technology is not suitable for a situation where it is desired to move the cursor to focus on a small subject such as an animal pupil. If sensitivity to the movement amount of the finger on the touch pad is reduced, it can be easy to move the cursor by one point by using the above technology; however, the advantage of the above technology that multi-point movement is easy is impaired.

As described above, there are a case where it is desired to quickly move the cursor to the separated position and a case where it is desired to finely adjust the position of the cursor, according to the shooting scene, and thus it is difficult to perform a cursor moving operation suitable for all scenes with a conventional joystick or touch pad alone.

Thus, regarding a camera technology field in recent years, many cameras on which both an operation member, such as a joystick, which provides a physical feeling and is easy to move by one point, and an operation member, such as a touch pad, which can detect a movement amount of a finger and is easy to move by multiple points have been on the market. However, since these operation members are arranged apart from each other, it is necessary for the user to move a location where a finger for operation is placed in order to properly use the operation members. Accordingly, for example, when an operation such as finely adjusting the position of the cursor after the cursor is roughly moved is performed, it is often necessary to move a location where the finger for operation is placed, and operability deteriorates.

There is, in order to prevent such deterioration in operability, a complex operation member in which a joystick and a trackball are integrally combined (see, for example, Patent Literature (PTL) 1). According to Patent Literature 1, a trackball and a swing type input device are arranged in one location in a concentrated manner, and thus, the user can perform a plurality of types of inputs only by changing a way of action of a fingertip of the same finger without moving the location where the finger for operation is placed.

CITATION LIST

Patent Literature

PTL 1 Japanese Patent No. 6229119

However, the trackball is structurally required to have a gap for sliding between a ball and a ball holding part. There is a problem that since there is a concern about the entrance of dust garbage or drip-proof properties, the trackball is not suitable for a portable device such as a camera frequently used outdoors.

The present invention provides an image pickup apparatus capable of performing an operation of quickly moving a display object in a screen to a separated position and an operation of finely adjusting a position without requiring to move a location where a finger for operation is placed.

SUMMARY OF THE INVENTION

An image pickup apparatus according to claim 1 of the present invention is an image pickup apparatus that is configured to, when a position where autofocus is performed in a screen on which a shot image is displayed is selected by a user, perform the autofocus at the selected position, the image pickup apparatus comprising a first operation device, a second operation device, a holding member configured to hold the first operation device and detect swing by the user, at least one memory that stores a set of instructions and at least one processor that executes the instructions, the instructions, when being executed, causing the image pickup apparatus to: display, on the screen, a display object indicating the selected position; by the first operation device, detect sliding movement of a finger of the user, and perform a first moving operation of moving a position of the display object displayed on the screen based on a movement amount and a movement direction of the sliding movement; by the second operation device, when the holding member detects the swing by the user, perform a second moving operation of moving, on a unit basis, the position of the display object displayed on the screen based on a direction of the swing, wherein the position of the display object displayed on the screen is moved by the first operation device and the second operation device when autofocus is performed in a shooting scene of a moving subject.

Further features of the present invention will become apparent from the following description of exemplary embodiments (with reference to the attached drawings).

DESCRIPTION OF THE EMBODIMENTS

Hereinafter, embodiments for implementing the present invention will be described in detail.

It should be noted that the embodiments to be described below are examples for realizing the present invention, and should be appropriately modified or changed according to a configuration of an apparatus to which the present invention is applied and various conditions, and the present invention is not limited to the following embodiments. Some of the embodiments to be described later may be appropriately combined.

First, a configuration and a function of a single-lens reflex digital camera (hereinafter, referred to as a camera) 1000 as an image pickup apparatus according to the present embodiment will be described with reference to FIGS. 1A and 1B.

Figure 1A:
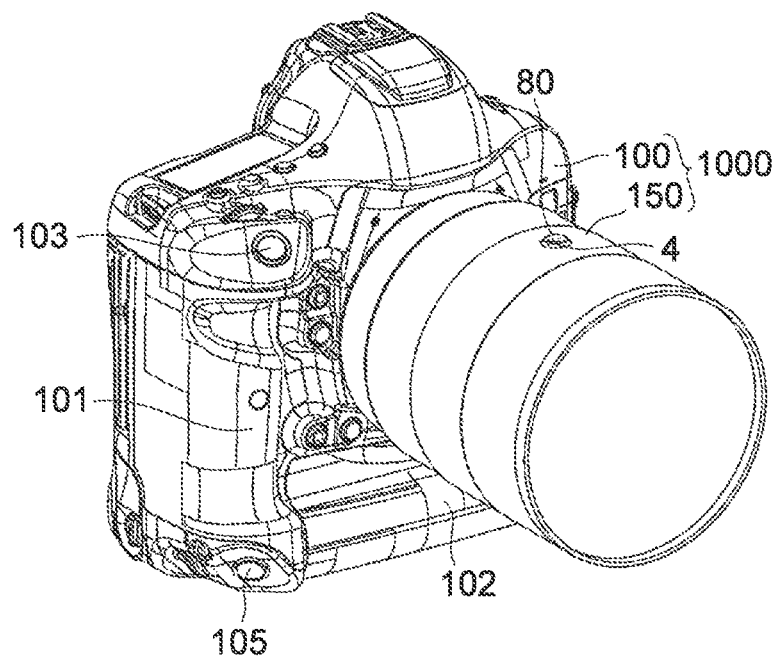
FIG. 1A is an external perspective view of a camera as an image pickup apparatus according to a first embodiment of the present invention.
Figure 1B:
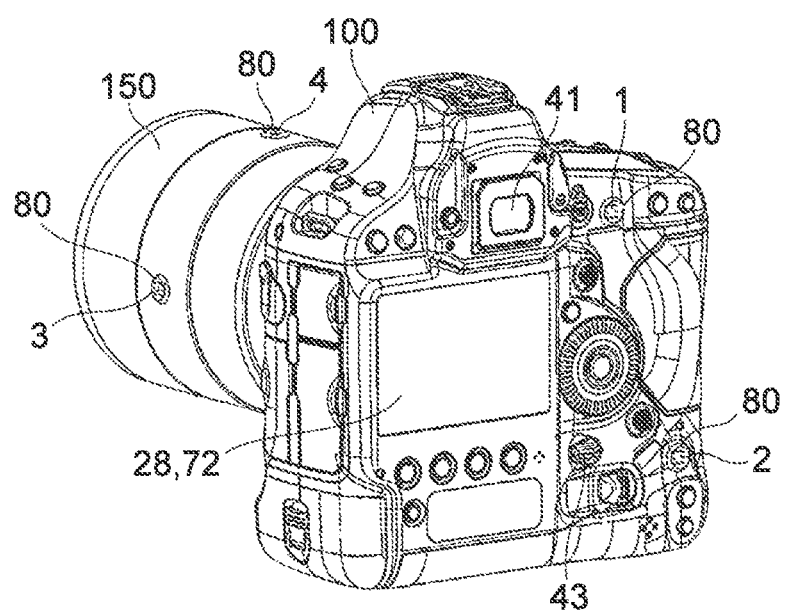
FIG. 1B is an external perspective view of the camera as the image pickup apparatus according to the first embodiment of the present invention.

FIGS. 1A and 1B are external perspective views of the camera 1000. FIG. 1A is a perspective view of the camera 1000 as viewed from a front side (front surface side), and FIG. 1B is a perspective view of the camera 1000 as viewed from a rear side.

The camera 1000 includes a camera body 100 and a lens unit 150 on which a taking lens is mounted and which is detachable from the camera body 100.

As shown in FIG. 1A, a first grip part 101 and a second grip part 102 protruding forward are provided on the camera body 100.

The first grip part 101 allows a user to stably hold and operate the camera body 100 when the user shoots while holding the camera 1000 in a normal position posture (a posture in which a horizontal dimension of a substantially rectangular image pickup region is set to be longer than a vertical dimension thereof in an image pickup part 22 to be described later). The second grip part 102 allows the user to stably hold and operate the camera body 100 when the user shoots while holding the camera 1000 in a vertical position posture (posture in which the vertical dimension of the substantially rectangular image pickup region is set to be longer than the horizontal dimension thereof in the image pickup part 22). It should be noted that the second grip part 102 may be formed integrally with the camera body 100 or may be detachable from the camera body 100.

As shown in FIG. 1A, shutter buttons 103 and 105 are provided on the camera body 100.

Figure 5:
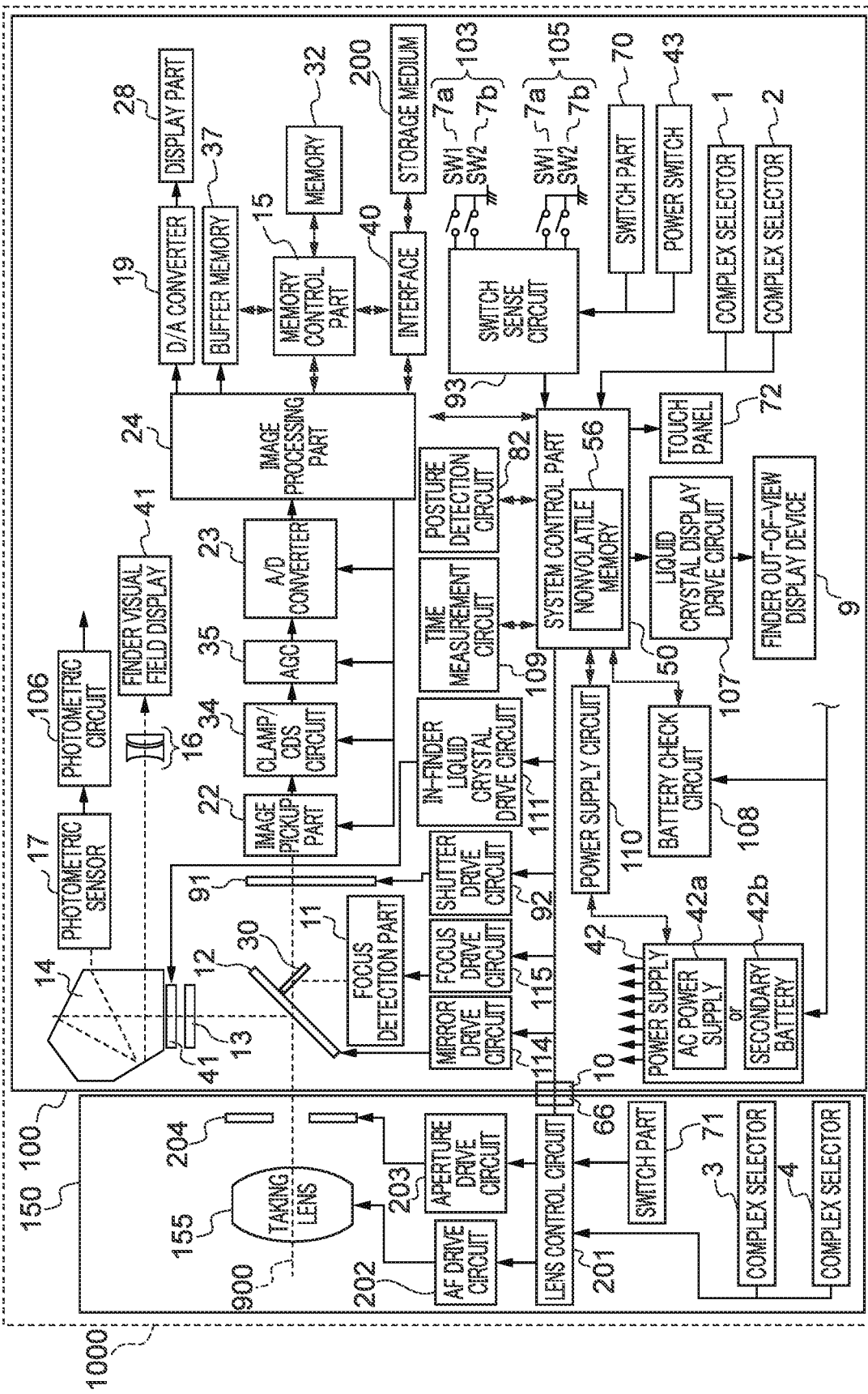
FIG. 5 is a block diagram showing a hardware configuration of the camera.

Each of the shutter buttons 103 and 105 is a button operated when an instruction to start shooting is given. When each of the shutter buttons 103 and 105 is half-pressed (pressed to a first stroke), switches 7a shown in FIG. 5 are turned on, and first shutter switch signals SW1 are generated. In response to the first shutter switch signals SW1, operations such as autofocus (AF) processing, automatic exposure (AE) processing, automatic white balance (AWB) processing, and pre-flash emission (EF) processing are started. It should be noted that the user can stop the AF processing by canceling the first stroke.

When each of the shutter buttons 103 and 105 is fully pressed (pressed to a second stroke), switches 7b shown in FIG. 5 are turned on, and second shutter switch signals SW2 are generated. As a result, an operation of a series of shooting processing from when a signal of the image pickup part 22 is read out (FIG. 5) to when image data is written in a storage medium 200 is started.

The camera 1000 includes, as AF modes, one-shot AF suitable for image-picking up a stationary subject and servo AF (continuous AF) suitable for image-picking up a moving subject.

In the one-shot AF, automatic focus detection is performed in a focus detection region arbitrarily selected by the user. When a focal point is detected, a focus lens included in a taking lens 155 of FIG. 5 is moved to a focal position, and the driving of the focus lens is stopped.

On the other hand, in the servo AF, the movement of a main subject is detected even after the focus lens is moved to the focal position. When the movement of the main subject is detected, the focus lens is continuously driven according to a defocus amount detected in the focus detection region.

The one-shot AF and the servo AF can be selected by the user. Hereinafter, the one-shot AF is referred to as a first automatic focus detection operation, and the servo AF is referred to as a second automatic focus detection operation.

It should be noted that the shutter button 103 is mainly used when shooting is performed with the camera 1000 in the normal position posture, and the shutter button 105 is mainly used when shooting is performed with the camera 1000 in the vertical position posture.

As shown in FIG. 1B, a power switch 43, a finder visual field display 41, a display part 28, and complex selectors 1 and 2 are provided on the camera body 100. As shown in FIGS. 1A and 1B, complex selectors 3 and 4 are provided on the lens unit 150.

The power switch 43 is used to turn on or off the power of the camera 1000.

The finder visual field display 41 is a so-called near-eye display that displays, on a screen, a shot image by the camera 1000 used to check the focus and composition of an optical image incident via the lens unit 150. The finder visual field display 41 displays the optical image from a finder 16 (FIG. 5) together with information to be described later in FIG. 6A.

On the display part 28, the shot image by the camera 1000, various kinds of information, and the like are displayed on a screen. A touch panel 72 capable of receiving a touch operation (touch detection) is provided on a display surface of the display part 28. The touch panel 72 may be provided so as to be superimposed on the display part 28, or may be provided integrally with the display part 28.

The complex selectors 1 to 4 are operated by the finger of the user to perform cursor movement and a determination operation. Each of the complex selectors 1 to 4 is a combination of a touch operation member (hereinafter, referred to as an optical track pointer (OTP)) 60 and an AF-ON button 80. The OTP 60 optically detects movement of a pattern such as a fingerprint of the finger as a change amount of a fingertip position. The AF-ON button 80 is a joystick operation member (second operation device) that performs input (hereinafter, referred to as a joystick operation) in up, down, left, and right directions (cross direction) by a physical switch. The complex selectors 1 to 4 are operation members capable of inputting information regarding movement in a two-dimensional direction by detecting a touch operation or detecting swing by pushing in the up, down, left, and right directions.

The AF (autofocus) processing is started by each AF-ON button 80 of the complex selectors 1 to 4 being pressed. When the pressing on the AF-ON button 80 is released, the AF processing is stopped. It should be noted that the AF-ON button 80 of each of the complex selectors 1 and 2 is included in a switch part 70 (FIG. 5) to be described later, and the AF-ON button 80 of each of the complex selectors 3 and 4 is included in a switch part 71 (FIG. 5) to be described later.

A system control part 50 (FIG. 5) moves a position of a ranging point frame displayed in the screen of the finder visual field display 41 or the display part 28 based on movement information (movement amount and movement direction) of the finger which relatively moves, which is as outputs of the complex selectors 1 to 4. Here, the ranging point frame refers to a frame for setting a position where AF is performed. When the ranging point frame is determined, the system control part 50 controls a focus detection part 11 such that AF is performed in the frame.

It should be noted that a target to be moved based on the outputs of the complex selectors 1 to 4 is not limited to the ranging point frame and the ranging frame as long as the target is a display object that can be displayed on the finder visual field display 41 or the display part 28 and the position thereof can be moved. For example, the system control part 50 may switch an image being reproducing to a next image to be reproduced based on the outputs of the complex selectors 1 to 4. Furthermore, the system control part 50 may switch between setting values of, for example, movement of a cursor for selection performed on a menu screen, a shutter speed, ISO sensitivity, an aperture, and exposure correction of the camera 1000, based on the outputs of the complex selectors 1 to 4. Each of the complex selectors 1 to 4 also functions as the AF-ON button 80.

The user who operates the camera 1000 touches one of the complex selectors 1 to 4 with the finger, and then slidably moves the finger in the two-dimensional direction or presses that in a desired direction. In response to this operation, the system control part 50 moves a ranging point frame 405 displayed on the finder visual field display 41 and a ranging point frame 305 that can be displayed on the display part 28. Further, when a central part of one of the complex selectors 1 to 4 that has been slidably moved or pressed, is pressed without being released by the finger or released, the system control part 50 switches between on and off of the AF (autofocus) processing.

Figure 2A:
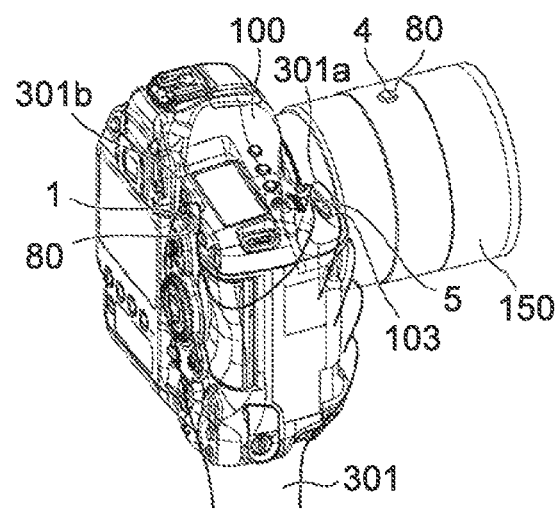
FIG. 2A is a diagram showing arrangement of a shutter button on a camera body in FIGS. 1A and 1B and a plurality of complex selectors each having a function of an AF-ON button, the shutter button and the complex selector being targets of a user operation at the time of shooting by the camera.
Figure 2B:
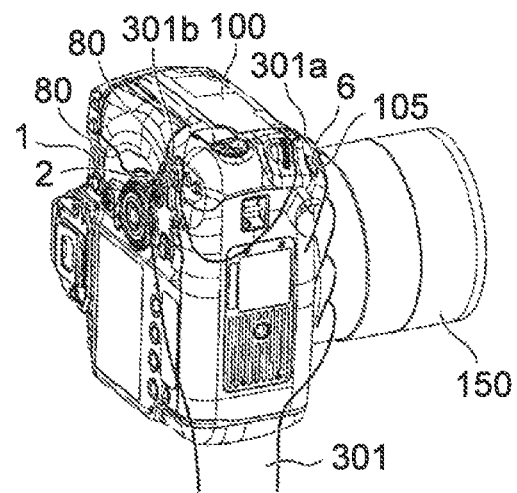
FIG. 2B is a diagram showing the arrangement of the shutter button on the camera body in FIGS. 1A and 1B and the complex selectors each having the function of the AF-ON button, the shutter button and the complex selector being the targets of the user operation at the time of shooting by the camera.
Figure 2C:
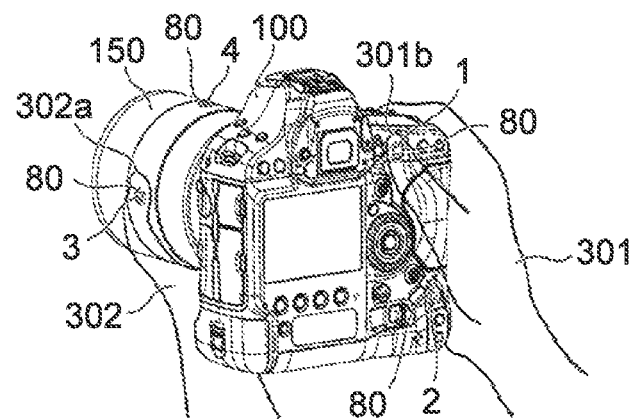
FIG. 2C is a diagram showing the arrangement of the shutter button on the camera body in FIGS. 1A and 1B and the complex selectors each having the function of the AF-ON button, the shutter button and the complex selector being the targets of the user operation at the time of shooting by the camera.
Figure 2D:
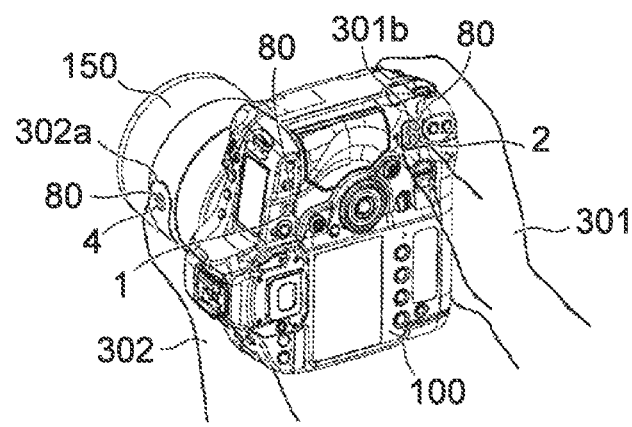
FIG. 2D is a diagram showing the arrangement of the shutter button on the camera body in FIGS. 1A and 1B and the complex selectors each having the function of the AF-ON button, the shutter button and the complex selector being the targets of the user operation at the time of shooting by the camera.

FIGS. 2A to 2D are diagrams showing the arrangement of two shutter buttons 103 and 105 present on the camera body 100 and four complex selectors 1 to 4 each having the function of the AF-ON button 80, which are targets of user operation at the time of shooting by the camera 1000. FIG. 2A is a perspective view showing a state where one shutter button 103 and one complex selector 1 of the camera body 100 are being pressed by one hand of the user. FIG. 2B is a perspective view showing a state where the other shutter button 105 and the other complex selector 2 of the camera body 100 are being pressed with one hand of the user. FIG. 2C is a perspective view showing a state where pressing of one complex selector 1 of the camera body 100 by the right hand of the user and pressing of one complex selector 3 of the lens unit 150 by the left hand of the user are simultaneously being performed. FIG. 2D is a perspective view showing a state where pressing of the other complex selector 2 of the camera body 100 by the right hand of the user and pressing of the other complex selector 4 of the lens unit 150 by the left hand of the user are simultaneously being performed.

As shown in FIG. 2A, the shutter button 103 is disposed at a position where the shutter button 103 can be operated with an index finger 301a of a right hand 301 gripping the first grip part 101, and the complex selector 1 is disposed at a position where the complex selector 1 can be operated with a thumb 301b of a right hand 301. That is, when the camera 1000 is viewed from above, the shutter button 103 is disposed at a position overlapping a protrusion part of the first grip part 101.

Similarly, as shown in FIG. 2B, the shutter button 105 is disposed at a position where the shutter button 105 can be operated with the index finger 301a of the right hand 301 gripping the second grip part 102, and the complex selector 2 is disposed at a position where the complex selector 2 can be operated with the thumb 301b of the right hand 301. That is, when the camera 1000 is viewed from the rear side, the shutter button 105 is disposed at a position overlapping a protrusion part of the second grip part 102.

As shown in FIG. 2C, the complex selector 3 of the lens unit 150 is disposed at a position where the complex selector 3 can be operated by the thumb 302a of the left hand 302 when the right hand 301 is holding the camera 1000 as shown in FIG. 2A.

As shown in FIG. 2D, the complex selector 4 of the lens unit 150 is disposed at a position where the complex selector 4 can be operated by the thumb 302a of the left hand 302 when the right hand 301 is holding the camera 1000 as shown in FIG. 2B.

Configurations of the complex selectors 1 to 4 will be described with reference to FIGS. 3, 4A, and 4B. It should be noted that since all the configurations of the complex selectors 1 to 4 are the same, only the complex selector 1 will be described here.

Figure 3:
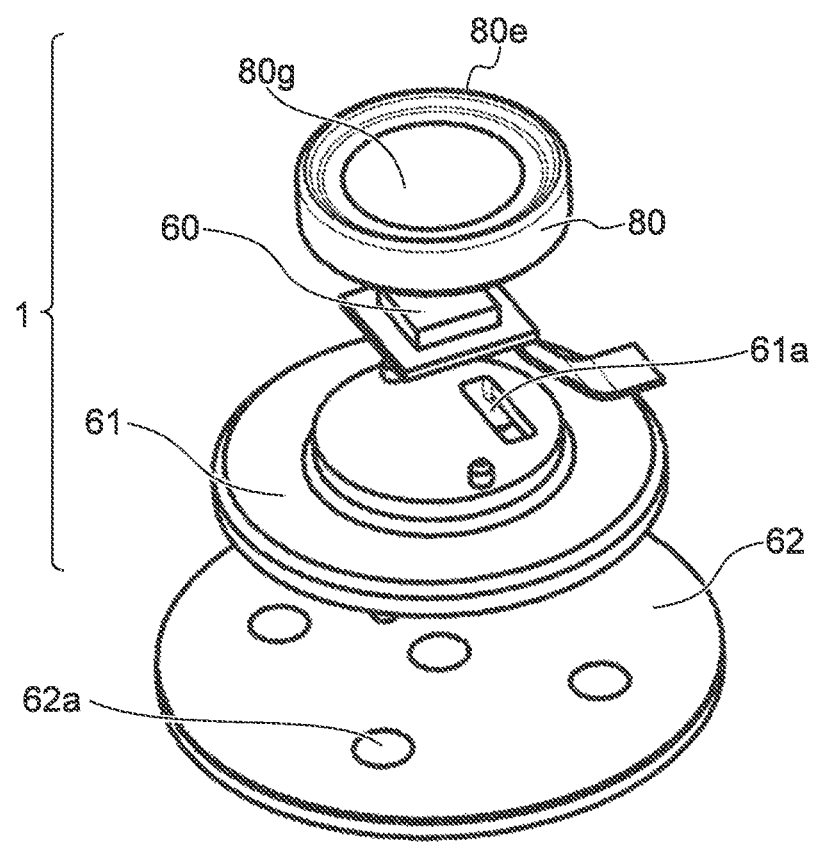
FIG. 3 is an exploded perspective view of the complex selector in FIGS. 1A and 1B.
Figure 4A:
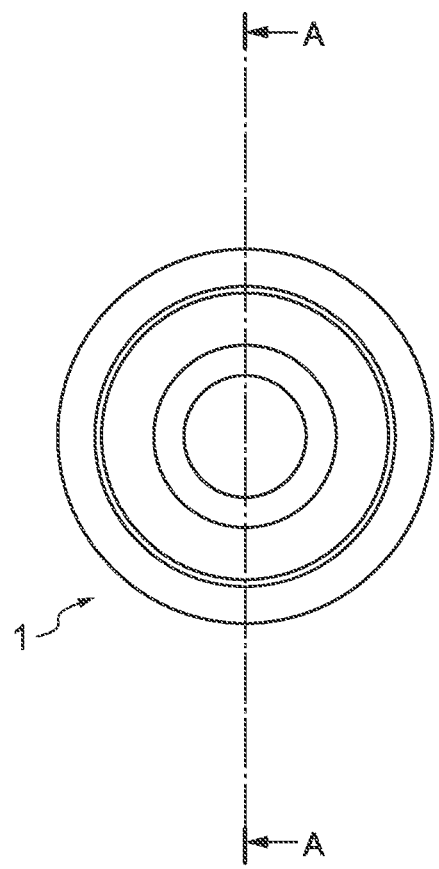
FIG. 4A is a top view of the complex selector of FIG. 3.
Figure 4B:
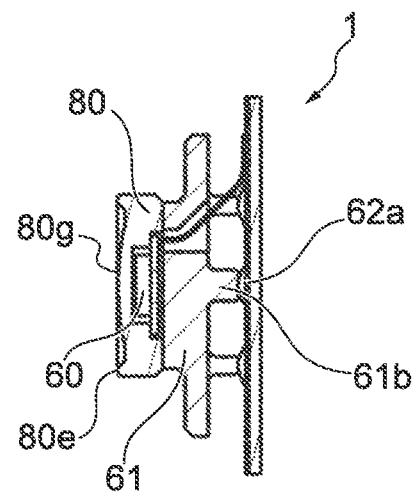
FIG. 4B is a cross-sectional view of the complex selector of FIG. 3.

FIG. 3 is an exploded perspective view of the complex selector 1. FIG. 4A is a top view of the complex selector 1, and FIG. 4B is a cross-sectional view taken along line A-A of the complex selector 1 in FIG. 4A.

The AF-ON button 80 for performing the operation with the finger is disposed on an uppermost surface of the complex selector 1. A projection edge part 80e is provided in the AF-ON button 80 over an outer periphery, and functions as an appropriate finger hook when the joystick operation is performed with the finger. A window part 80g that transmits infrared light is provided at a central part of the AF-ON button 80.

The OTP 60 (first operation device) which is the optical track pointer is disposed immediately below the window part 80g. That is, the window part 80g functions as a cover member that covers the OTP 60. A light-emitting part and an optical position detection element (both not shown) are mounted on the OTP 60, and the light-emitting part irradiates the finger placed on a surface of the AF-ON button 80 with the infrared light. The OTP 60 measures a movement amount of the sliding movement of the finger of the user by the optical position detection element, from reflected light of the irradiated infrared light from the finger or a pattern such as the fingerprint of the finger. The optical position detection element can be realized by, for example, a light-receiving element such as an image sensor.

It should be noted that in the present embodiment, the OTP 60 is a touch sensor of an infrared light type, but may be a touch sensor of a resistive film type, a surface acoustic wave type, a capacitance type, an electromagnetic induction type, an image recognition type, an optical sensor type, or the like, or another type.

The AF-ON button 80 and the OTP 60 are held by a button base 61 (holding member). A hole part 61a is provided on the button base 61, and thus, a flexible board for connecting the OTP 60 to the system control part 50 (FIG. 5) can pass through. One or more protruding leg-shaped parts 61b are provided on a lower surface of the button base 61, and each presses a dome switch 62a to be described later paired with each of the leg-shaped parts 61b.

An AF-ON board 62 is disposed below the complex selector 1. On the AF-ON board 62, one or more dome switches 62a are arranged at positions facing the leg-shaped parts 61b provided on the button base 61 described above. Whenever the swing by the user is detected by the complex selector 1 being pressed or laid down by the fingertip, the leg-shaped part 61b presses the dome switch 62a to generate a physical click feeling (generation unit). At the same time, a contact point between the leg-shaped part 61b and the dome switch 62a conducts a conductive pattern on the AF-ON board 62, and thus, the pressing of the AF-ON button 80 and a direction of the swing by the user are detected. In the present embodiment, the leg-shaped parts 61b and the dome switches 62a are arranged at five locations of a center of the AF-ON board 62 and positions in the upper, lower, left, and right directions (cross direction) with respect to the said center, but the number and arrangement are not limited thereto. For example, the leg-shaped parts 61b and the dome switches 62a may be arranged at nine locations obtained by further adding four oblique directions to the center of the AF-ON board 62. In the present embodiment, the dome switch 62a is used as a detection unit for detecting the pressing of the AF-ON button 80, but the present invention is not limited thereto. For example, a tact switch using a conductive rubber switch or an inversion spring may be used as a detection unit.

FIG. 5 is a block diagram showing a hardware configuration of the camera 1000. It should be noted that, in FIG. 5, the same components as the components shown in FIGS. 1A to 4B are denoted by the same reference signs.

As described above, the lens unit 150 is detachable from the camera body 100. The lens unit 150 includes the taking lens 155. The taking lens 155 is composed of, for example, a plurality of lenses including a focus lens, but only one lens is shown here for the sake of simplification.

A communication terminal 66 is a terminal for the lens unit 150 to communicate with the camera body 100, and a communication terminal 10 is a terminal for the camera body 100 to communicate with the lens unit 150. That is, the lens unit 150 communicates with the system control part 50 via the communication terminals 66 and 10.

The lens unit 150 includes a lens control circuit 201, and the lens control circuit 201 drives and controls an aperture 204 by an aperture drive circuit 203. The lens control circuit 201 causes an AF drive circuit 202 to displace a position of the taking lens 155 along an optical axis 900 to focus on. The complex selectors 3 and 4 are connected to the lens control circuit 201.

It should be noted that the lens unit 150 may be attached to the camera body 100 via an attachment part to which the lens unit 150 can be attached. As the lens unit 150, a lens unit including various types of lenses such as a single focus lens or a zoom lens as the taking lens 155 can be attached to the camera body 100.

A photometric circuit 106 uses a photometric sensor 17 to measure the luminance of the subject formed on a focusing screen 13 via a quick-return mirror 12. The photometric circuit 106 sends the photometry result to the system control part 50.

The focus detection part 11 is driven by a focus drive circuit 115 controlled by the system control part 50. The focus detection part 11 obtains a defocus amount by a phase difference detection method according to an optical image incident via the quick-return mirror 12, and outputs the defocus amount to the system control part 50.

The system control part 50 controls the lens unit 150 based on the defocus amount to perform phase difference AF. It should be noted that, in the present embodiment, the phase difference AF based on the defocus amount obtained by the focus detection part 11 is performed, but the phase difference AF may not be performed as long as AF can be performed. For example, contrast AF may be used. When the phase difference AF is performed, so-called image pickup plane phase difference AF for performing the phase difference AF based on the defocus amount detected on an image pickup plane of the image pickup part 22 may be performed without using the focus detection part 11.

The system control part 50 controls a mirror drive circuit 114 to move the quick-return mirror 12 up and down during exposure, live view shooting, and moving image shooting. The quick-return mirror 12 is a mirror for sending an optical image incident via the taking lens 155 to either the finder 16 or the image pickup part 22.

The quick-return mirror 12 is usually positioned at a position where the optical image is reflected and guided to the finder 16. That is, the quick-return mirror 12 is usually positioned on an optical path (mirror down). On the other hand, when shooting or live view display is performed, the quick-return mirror 12 is positioned at a position where an optical image is guided to the image pickup part 22. That is, the quick-return mirror 12 is flipped upward and retracts from the optical path (mirror up).

It should be noted that the quick-return mirror 12 is a half mirror through which a part of light can be transmitted at a central portion thereof, and a part of light is transmitted through the quick-return mirror 12 at the time of mirror down. The transmitted light is reflected by a sub-mirror 30 and is incident on the focus detection part 11.

The user observes the optical image formed on the focusing screen 13 through a pentaprism 14 and the finder 16. As a result, the user can check a focus state and a composition in a subject image obtained through the lens unit 150.

It should be noted that the camera 1000 may have a so-called mirrorless camera structure in which the focus state and composition in the subject image are checked by using only the live view.

The image pickup part 22 is an image pickup device including a CCD, a CMOS element, or the like that converts the optical image into an electrical signal, in which a region that can be subjected to image-pickup has a substantially rectangular shape. A shutter 91 is disposed in front of the image pickup part 22, and the system control part 50 drives the shutter 91 by a shutter drive circuit 92.

An analog image signal which is an output of the image pickup part 22 is sent to an A/D converter 23 via a clamp/CDS circuit 34 and an AGC 35. The A/D converter 23 converts the analog image signal into a digital image signal.

An image processing part 24 performs resizing processing such as predetermined pixel interpolation and reduction, and color conversion processing on the digital image signal sent from the A/D converter 23 or the image data sent from a memory control part 15. The image processing part 24 performs predetermined calculation processing by using image data obtained by image pickup. The system control part 50 performs exposure control and ranging control based on the calculation result. As a result, autofocus (AF) processing, auto exposure (AE) processing, and pre-flash emission (EF) processing in a through-the-lens (TTL) method are performed.

The image processing part 24 performs predetermined calculation processing by using image data obtained by image pickup, and performs automatic white balance (AWB) processing in the TTL method based on the calculation result.

A memory 32 stores the digital image signal (image data) picked up by the image pickup part 22 and A/D-converted by the A/D converter 23, and display image data to be displayed on the display part 28. The memory 32 has a sufficient storage capacity for storing a predetermined number of still images, a moving image and sound for a predetermined time. It should be noted that the memory 32 may be a detachable recording medium such as a memory card, or may be a built-in memory.

A buffer memory 37 for temporarily recording the image data is connected to the image processing part 24. The storage medium 200 is connected to the memory control part 15 via an interface 40.

The display part 28 is a rear monitor for displaying an image, and is disposed on a rear surface of the camera body 100 as shown in FIG. 1B. The image processing part 24 performs D/A conversion on the image data via a D/A converter 19 under the control of the system control part 50, and displays the image data as an image on the display part 28. It should be noted that the display part 28 is not limited to a liquid crystal display as long as the display part displays an image, and may be another display such as an organic EL display.

A nonvolatile memory 56 is a memory that can electrically erasing and recording by the system control part 50, and for example, an EEPROM is adopted thereto. The nonvolatile memory 56 stores constants, programs, and the like for operation of the system control part 50.

A time measurement circuit 109 measures a time required when the system control part 50 performs various kinds of control, and transmits the measured time to the system control part 50.

A posture detection circuit 82 has, for example, a gyro sensor or the like, detects the posture of the camera 1000, and notifies the system control part 50 of the detected posture.

The system control part 50 incorporates at least one processor and controls the entire camera 1000. As shown in the drawing, the shutter button 103 and the shutter button 105, the switch part 70, and the power switch 43 are connected to the system control part 50 via a switch sense circuit 93. The complex selectors 1 to 4 are connected to the system control part 50. It should be noted that the complex selectors 3 and 4 in the lens unit 150 are connected to the system control part 50 via the lens control circuit 201.

The system control part 50 can interlock various functions by receiving, as an input, a direction of movement by a sliding operation or a tilting operation of the joystick based on the outputs of the complex selectors 1 to 4.

For example, the system control part 50 obtains the position of the ranging point frame or the ranging point frame after its movement (ranging point frame 305 (FIG. 6B), ranging point frame 405 (FIG. 6A)) based on the movement amount and the movement direction stored in the nonvolatile memory 56 by the complex selectors 1 to 4. The system control part 50 displays the position after movement on the display part 28 or displays the position on the finder visual field display 41 by an in-finder liquid crystal drive circuit 111.

Figure 6A:
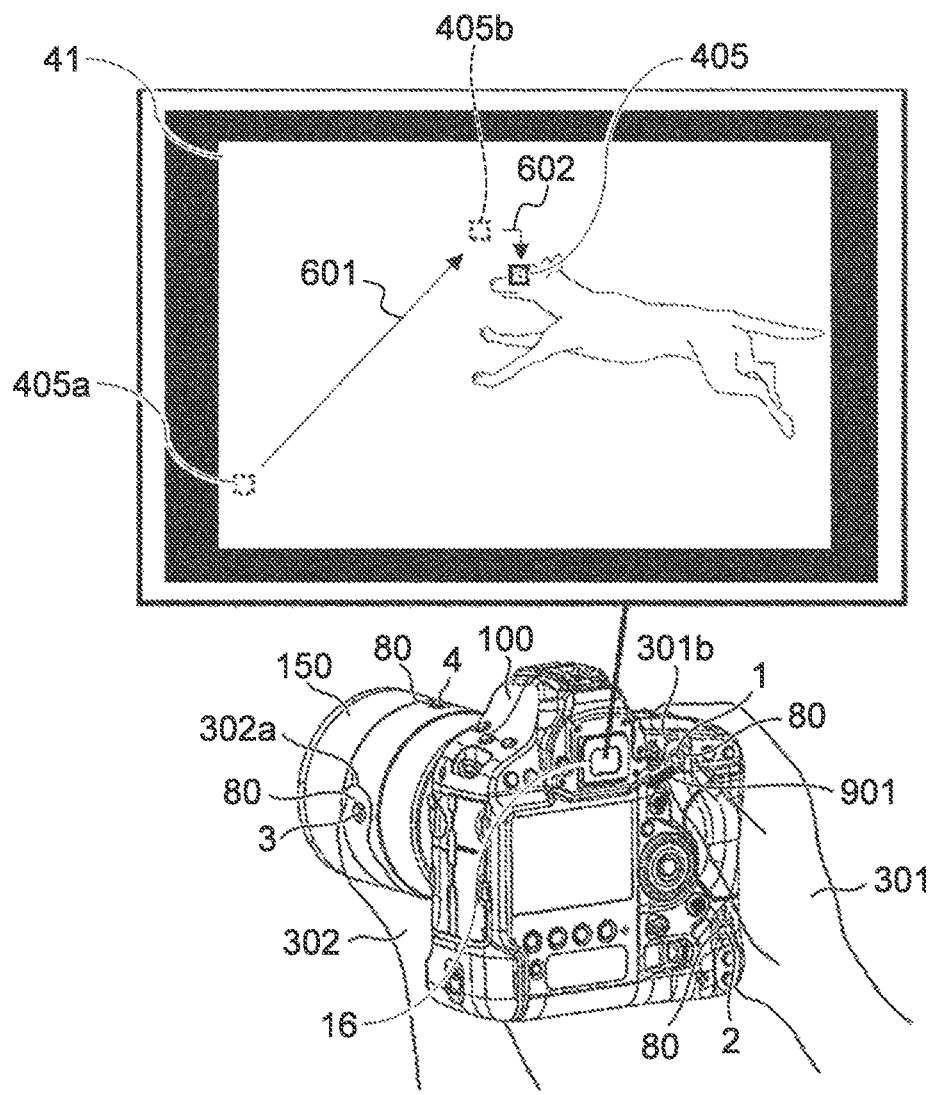
FIG. 6A is a diagram for describing a moving operation, of a ranging point frame displayed on a finder visual field display in FIGS. 1A and 1B, performed using the complex selector when a moving subject is shot by the camera.
Figure 6B:
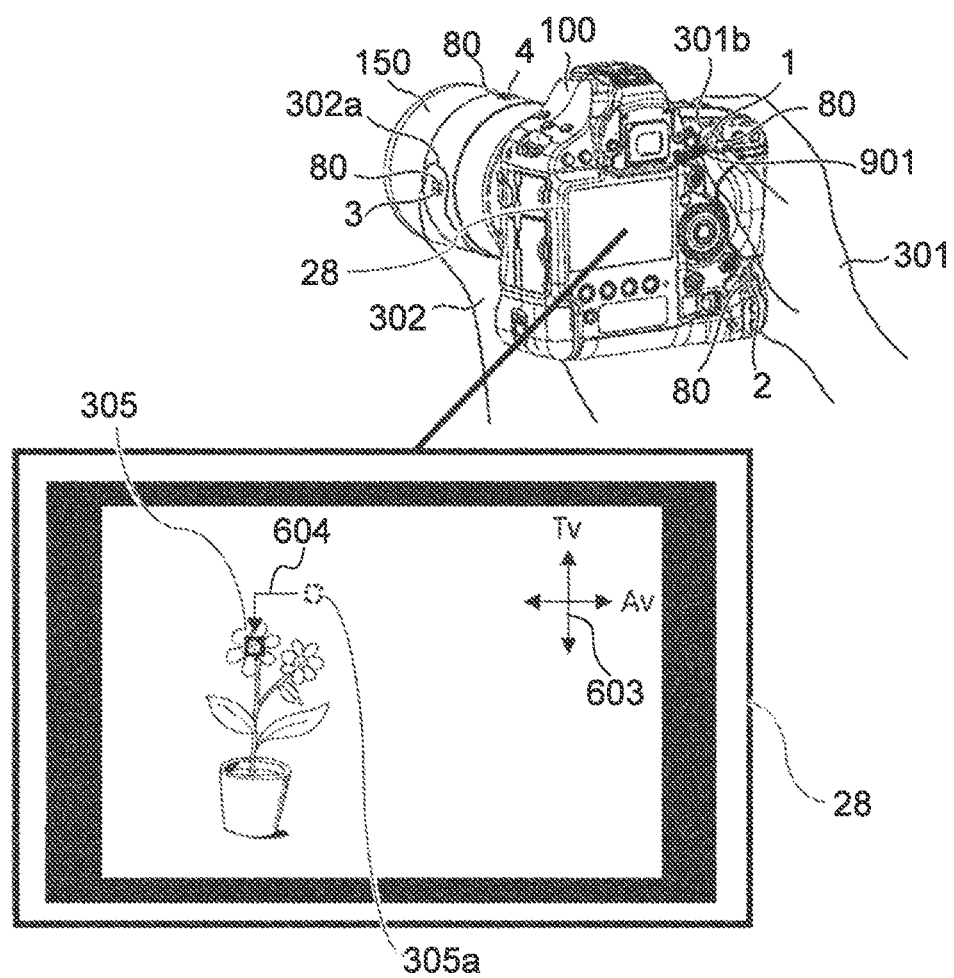
FIG. 6B is a diagram for describing the moving operation, of the ranging point frame displayed on a display part in FIGS. 1A and 1B and a changing operation of a shooting parameter, performed using the complex selector when a stationary subject is shot by the camera.

FIGS. 6A and 6B are diagrams for describing an example of the shooting using the camera 1000. Specifically, FIG. 6A is a diagram for describing a moving operation of the ranging point frame using the complex selector 1 in a shooting scene in which a moving subject is shot by the camera 1000. FIG. 6B is a diagram for describing a moving operation of the ranging point frame and a changing operation of a shooting parameter using the complex selector 1 in a shooting scene where a stationary subject is shot by the camera 1000.

Hereinafter, a case where the user gripping the first grip part 101 with the right hand 301 and operating the complex selector 1 with the thumb 301b of the right hand 301 will be described as an example.

In FIG. 6A, a ranging point frame 405a is a ranging point frame before movement displayed on the finder visual field display 41. The ranging point frame 405 is a ranging point frame after movement.

In FIG. 6A, in order to enhance immediacy with respect to the moving subject, the user first slidably moves the fingertip of the thumb 301b on the complex selector 1 to perform the ranging point frame movement by the OTP 60. That is, in FIG. 6A, an arrow 601 indicates the movement amount of the ranging point frame calculated by the system control part 50 from the change amount of the fingertip position detected by the OTP 60, and a ranging point frame 405b indicates a position where the ranging point frame 405a is moved by the arrow 601. The ranging point frame can be largely moved from the ranging point frame 405a to the ranging point frame 405b by one sliding operation with the thumb 301b, which makes the ranging point frame possible to be quickly brought close to a target position (subject).

Subsequently, in order to more accurately set a ranging point frame to the subject, the user tilts the complex selector 1 and performs the ranging point frame movement by the joystick operation. That is, in FIG. 6A, an arrow 602 indicates a locus of the ranging point frame moved from the ranging point frame 405b to the ranging point frame 405 by the joystick operation. The movement of the ranging point frame by the joystick operation is movement for one frame (movement on a unit basis) in a direction in which the joystick operation is performed for one operation and a click feeling is given by every operation, whereby the user can accurately move the ranging point frame by a minute distance. It should be noted that, in a state where the user tilts the complex selector 1 and performs the joystick operation in this shooting scene, the OTP 60 becomes in a non-reaction state in which the OTP 60 is disabled, that is, the OTP 60 does not detect the change amount of the fingertip position. As a result, it is possible to avoid a problem that the OTP 60 detects a slight movement of the fingertip of the user at the time of the joystick operation, and ranging point frame movement not intended by the user is performed. It should be noted that a state of the OTP 60 is not limited to the configuration of the present embodiment as long as such a problem can be avoided. For example, a specific detection threshold value may be set for the OTP 60, and the sensitivity of the OTP 60 may be lowered such that the OTP 60 does not detect a change amount when the change amount of the fingertip position is equal to or less than the detection threshold value even though the fingertip of the user slightly moves on the complex selector 1 regardless of whether or not the joystick operation is performed.

As described above with reference to FIG. 6A, the OTP 60 and the AF-ON button 80 which is a physical switch are arranged in the complex selector 1. As a result, the user can selectively perform a sliding operation for seamlessly and largely moving the ranging frame and a click operation for finely adjusting the position of the ranging frame, without moving the location of the finger to different operation members. The complex selector 1 in which the OTP 60 and the AF-ON button 80 which is the physical switch are combined is used for the ranging point frame movement, and thus, the user can cause the camera 1000 to quickly and accurately execute AF of a desired subject.

In FIG. 6B, a ranging point frame 305a is a ranging point frame before movement displayed on the display part 28. The ranging point frame 305 is a ranging point frame after movement.

Since the subject in the shooting scene shown in FIG. 6B is stationary as is different from the subject in the shooting scene shown in FIG. 6A, it is not necessary to immediately (quickly) move the ranging point frame 305a to the ranging point frame 305. In order to reliably move the ranging point frame 305a to the ranging point frame 305 which is a desired position, it is desirable to move the ranging point by the joystick operation which gives click feeling. That is, in FIG. 6B, an arrow 604 indicates a locus of the ranging point frame moved from the ranging point frame 305 to the ranging point frame 305a by the joystick operation.

In this shooting scene, unlike the case of FIG. 6A, that is, instead of the ranging point movement, a change of the shooting parameter is assigned to the operation by the OTP 60. That is, in FIG. 6B, an arrow 603 indicates the shooting parameter that can be changed by the OTP 60. Specifically, when slidably moving the thumb 301b up and down on the OTP 60, the user can change a shutter speed (Tv) which is one of the shooting parameters. Further, when sliding the thumb 301b left and right on the OTP 60, the user can change an aperture value (Av) which is one of the shooting parameters.

As described above with reference to FIG. 6B, in the shooting scene assuming the stationary subject, an operation target by the OTP 60 of the complex selector 1 is changed to a shooting parameter that is an operation target different from a ranging point frame that is an operation target in the case of the shooting scene assuming the shooting of the moving subject. As a result, the user can move the ranging point frame 305a and change the shooting parameter without moving a location where the finger is placed to a separate operation member, and operability at the time of capturing is improved. It should be noted that the operation target of the OTP 60 of the complex selector 1 may be another operation target as long as it is changed to the operation target different from the ranging point frame, and a specific operation target is not limited to the embodiment of the present embodiment. For example, the operation target of the OTP 60 of the complex selector 1 may be a pan/tilt direction of the camera 1000. In the present embodiment, the function assigned to the operation by the OTP 60 for each assumed shooting scene has been described, but the assignment of the function is not limited thereto. For example, it may be desired to assign the ranging point frame movement to the operation by the OTP 60 as shown in FIG. 6A even when the stationary subject is shot. Thus, specifically, switching between the functions to be assigned to the operations by the OTP 60 is performed in response to the user instruction.

It should be noted that, the moving operation of the ranging point frame and the changing operation of the shooting parameter which are performed using the complex selector 1 in the shooting scene have been described with reference to FIGS. 6A and 6B, but the user operation using the complex selector 1 is also performed in an operation scene other than the shooting scene. For example, the complex selector 1 can also be used in a mode setting scene. Here, the mode setting scene refers to a scene that instructs selection of one of a plurality of operation modes for performing image pickup, reproduction, and various settings in the camera 1000, start of the selected operation mode, and selection of various setting items in the started operation mode.

Hereinafter, an example of the user operation using the complex selector 1 in the mode setting scene will be described with reference to FIG. 7.

Figure 7:
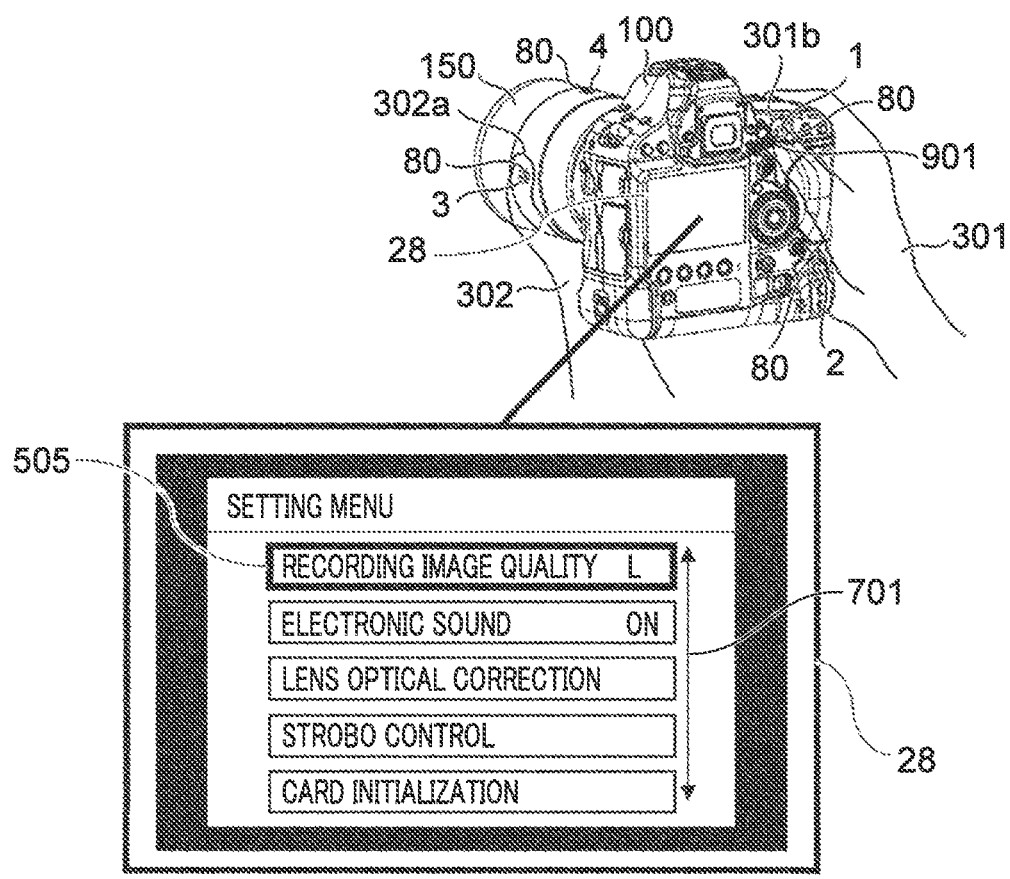
FIG. 7 is a diagram for describing a user operation using a complex selector on a menu screen displayed on the display part.

FIG. 7 is a diagram for describing a moving operation, by using the complex selector 1, of moving a selection frame 505 for selecting one of the various setting items on the menu screen displayed on the display part 28. It should be noted that this menu screen is displayed on the display part 28 when a setting mode for setting various setting items, out of a plurality of operation modes of the camera 1000, is selected and started.

On the menu screen displayed on the display part 28, the user can select various setting items of the camera 1000 with the selection frame 505, can change the setting or setting of ON/OFF of the selected setting item. That is, since the user operation on the menu screen shown in FIG. 7 is a discrete operation, the joystick operation is desirable. Thus, when the menu screen is displayed on the display part 28, in the present embodiment, only the joystick operation on the complex selector 1 is enabled. That is, the user can move the selection frame 505 in a direction of an arrow 701 by tilting the complex selector 1 in the upper or lower directions.

On the other hand, when there are only limited setting items as in the menu screen shown in FIG. 7, in the present embodiment, the OTP 60 is in the non-reaction state in which the OTP 60 is disabled, that is, the OTP 60 does not detect the change amount of the fingertip position. As a result, it is possible to avoid a problem that the OTP 60 also detects the slight movement of the fingertip by the user to cause an erroneous operation. It should be noted that a state of the OTP 60 is not limited to the configuration of the present embodiment as long as such a problem can be avoided. For example, a specific detection threshold value may be set for the OTP 60, and the sensitivity of the OTP 60 may be lowered such that the OTP 60 does not detect a change amount when the change amount of the fingertip position is equal to or less than the detection threshold value even though the fingertip of the user slightly moves on the complex selector 1. In this case, the joystick operation on the complex selector 1 is disabled.

As described with reference to FIGS. 6A, 6B, and 7, the operation target to be assigned to the operation by the OTP 60 and to the joystick operation of the complex selector 1, the sensitivity of the OTP 60, and the validity/invalidity of the OTP 60, are changed according to various operation scenes including the shooting scene. As a result, it is possible to reduce erroneous operations by the user on the complex selector 1, and the user can quickly achieve a desired purpose using the complex selector 1.

As described above, although in the present embodiment, the user operation on the complex selectors 1 and 2 arranged in the camera body 100 has been described, the arrangement of the complex selectors 1 and 2 may be different from the arrangement in the present embodiment, or may be arranged in an external device. For example, the movement of the ranging point frame and the change of the shooting parameters in the shooting scenes of FIGS. 6A and 6B, and the movement of the selection frame 505 of the menu screen in FIG. 7 may be performed based on the user operation on the complex selectors 3 and 4 arranged in the lens unit 150 of FIG. 1.

The present invention is also realized by executing the following processing. That is, the processing is processing of supplying software (program) for realizing the functions of the above-described embodiment to a system or an apparatus via a network or various storage media and reading and executing a program code by a computer (or a CPU, an MPU, or the like) of the system or the apparatus. In this case, the program and the storage medium storing the program constitute the present invention.

It goes without saying that a case where an OS (basic system or operating system) or the like running on the apparatus performs a part or all of the processing based on an instruction of the above-described program code and the function of the above-described embodiment is realized by the processing is included.

It goes without saying that a case where the program code read from the storage medium is written in a memory provided in a function expansion board inserted into the apparatus or a function expansion unit connected to the computer to realize the functions of the above-described embodiment is included. At this time, a CPU or the like provided in the function extension board or the function extension unit performs a part or all of actual processing based on an instruction of the program code.

OTHER EMBODIMENTS

The present invention can also be realized by processing of supplying a program for realizing one or more functions of the above-described embodiment to a system or an apparatus via the network or the storage medium and reading and executing the program by one or more processors in a computer of the system or the apparatus. The present invention can also be realized by a circuit (for example, ASIC) that realizes one or more functions.

The present invention is not limited to the above embodiments, and various changes and modifications can be made without departing from the spirit and scope of the present invention. Therefore, the following claims are attached in order to make the scope of the present invention public.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present invention, it is possible to perform the operation of quickly moving the display object in the screen to the separated position and the operation of finely adjusting the position without requiring to move the location where the finger for operation is placed.

The invention claimed is:

1. An image pickup apparatus that is configured to, when a position where autofocus is performed in a screen on which a shot image is displayed is selected by a user, perform the autofocus at the selected position, the image pickup apparatus comprising:
   a first operation device;
   a second operation device configured to hold the first operation device;
   at least one memory that stores a set of instructions; and
   at least one processor that executes the instructions, the instructions, when being executed, causing the image pickup apparatus to:
      display, on the screen, a display object indicating the selected position;
      by the first operation device, detect sliding movement of a finger of the user, and perform a first moving operation of moving a position of the display object displayed on the screen based on a movement amount and a movement direction of the sliding movement;
      by the second operation device, when the second operation device swings by the user, perform a second moving operation of moving, on a unit basis, the position of the display object displayed on the screen based on a direction of the swing of the second operation device; and move the position of the display object displayed on the screen by the first operation device and the second operation device when autofocus is performed in a shooting scene of a moving subject, wherein the second operation device is a joystick operation member, the first operation device is formed on a top surface of the second operation device, and by the user swinging the top surface of the second operation device while touching the first operation device with the finger of the user, the second moving operation is performed.

2. The image pickup apparatus according to claim 1, further comprising a holding member configured to hold the second operation device which holds the first operation device, wherein the second operation device further includes a generation unit configured to generate a click feeling whenever the holding member detects the swing of the first second operation device swings by the user.

3. The image pickup apparatus according to claim 1, wherein the first operation device is a touch sensor, and is configured to detect the movement amount of the sliding movement of the finger of the user placed on the first operation device.

4. The image pickup apparatus according to claim 3, wherein the touch sensor is a touch sensor of any type out of an infrared light type, a resistive film type, a surface acoustic wave type, a capacitance type, an electromagnetic induction type, an image recognition type, and an optical sensor type.

5. The image pickup apparatus according to claim 1, wherein when the movement amount of the sliding movement is equal to or less than a threshold value, the first moving operation is not performed.

6. The image pickup apparatus according to claim 1, wherein, when the second operation device swings by the user, the first moving operation is not performed.

7. The image pickup apparatus according to claim 1, wherein, in a mode setting scene where one mode out of a plurality of operation modes for performing image pickup, reproduction, and setting is to be set, at least one of the first moving operation and the second moving operation is disabled.

8. The image pickup apparatus according to claim 1, wherein when the autofocus is to be performed, movement of an operation target different from the first moving operation based on the movement amount and the movement direction of the sliding movement is performed according to a user instruction.

9. The image pickup apparatus according to claim 8, wherein the operation target is a shooting parameter changeable based on the movement amount and the movement direction of the sliding movement.

* * * * *